United States Patent [19]

Jones

[11] Patent Number: 5,381,898
[45] Date of Patent: Jan. 17, 1995

[54] PROTECTOR DEVICE FOR PROTECTING PAPER ROLLS

[76] Inventor: Richard A. Jones, 11 Pastoll Road, Pinetown, Natal Province, South Africa

[21] Appl. No.: 71,466

[22] Filed: Jun. 1, 1993

[30] Foreign Application Priority Data

Jun. 5, 1992 [ZA] South Africa ............... 92/4122
Nov. 24, 1992 [ZA] South Africa ............... 92/9096

[51] Int. Cl.⁶ .................. B65D 85/66; B65D 85/20; A47F 7/00
[52] U.S. Cl. .................. 206/391; 206/443; 206/446; 206/597; 211/59.4; 211/60.1
[58] Field of Search ............... 206/391, 394, 446, 443, 206/493, 160, 597; 211/59.4, 60.1

[56] References Cited

U.S. PATENT DOCUMENTS

| | | | |
|---|---|---|---|
| 2,588,278 | 3/1952 | Noerr | 206/391 |
| 3,206,020 | 9/1965 | Billingsley | 206/160 |
| 3,232,424 | 2/1966 | Stein et al. | 206/160 |
| 3,460,671 | 8/1969 | Harm | 206/391 |
| 3,760,974 | 9/1973 | Oglesbee | |
| 3,929,227 | 12/1975 | Burdis | 206/446 |
| 4,195,732 | 4/1980 | Bell | 206/391 |
| 4,435,463 | 3/1984 | Roellchen | 206/391 X |
| 4,516,677 | 5/1985 | Rowland et al. | 206/394 |
| 4,832,196 | 5/1989 | Butler | 206/391 |
| 4,901,870 | 2/1990 | Wright et al. | 211/59.4 |

FOREIGN PATENT DOCUMENTS

0270512 6/1988 European Pat. Off. .
306657 9/1928 United Kingdom .

*Primary Examiner*—Bryon P. Gehman
*Attorney, Agent, or Firm*—Curtis, Morris & Safford

[57] ABSTRACT

A protector device for protecting paper rolls during transport comprises an integrally formed synthetic plastic body, the body including a spacer column and a substantially planar, plate-like support formation extending transversely from the spacer column. In order to protect paper rolls during transport, the rolls can be spaced from one another by positioning the spacer column of a protector device between each pair of adjacent paper rolls positioned on the transport vehicle, the column being held in position by the support formation resting on the end of at least one of two adjacent paper rolls. The operative outer face of the support formation has corner formations projecting therefrom, the formations providing for the location of tying ropes for tying the paper rolls on the transport vehicle, thus preventing any damage that could otherwise be caused to the paper rolls by the tying ropes, if the protection device is not utilized.

10 Claims, 3 Drawing Sheets

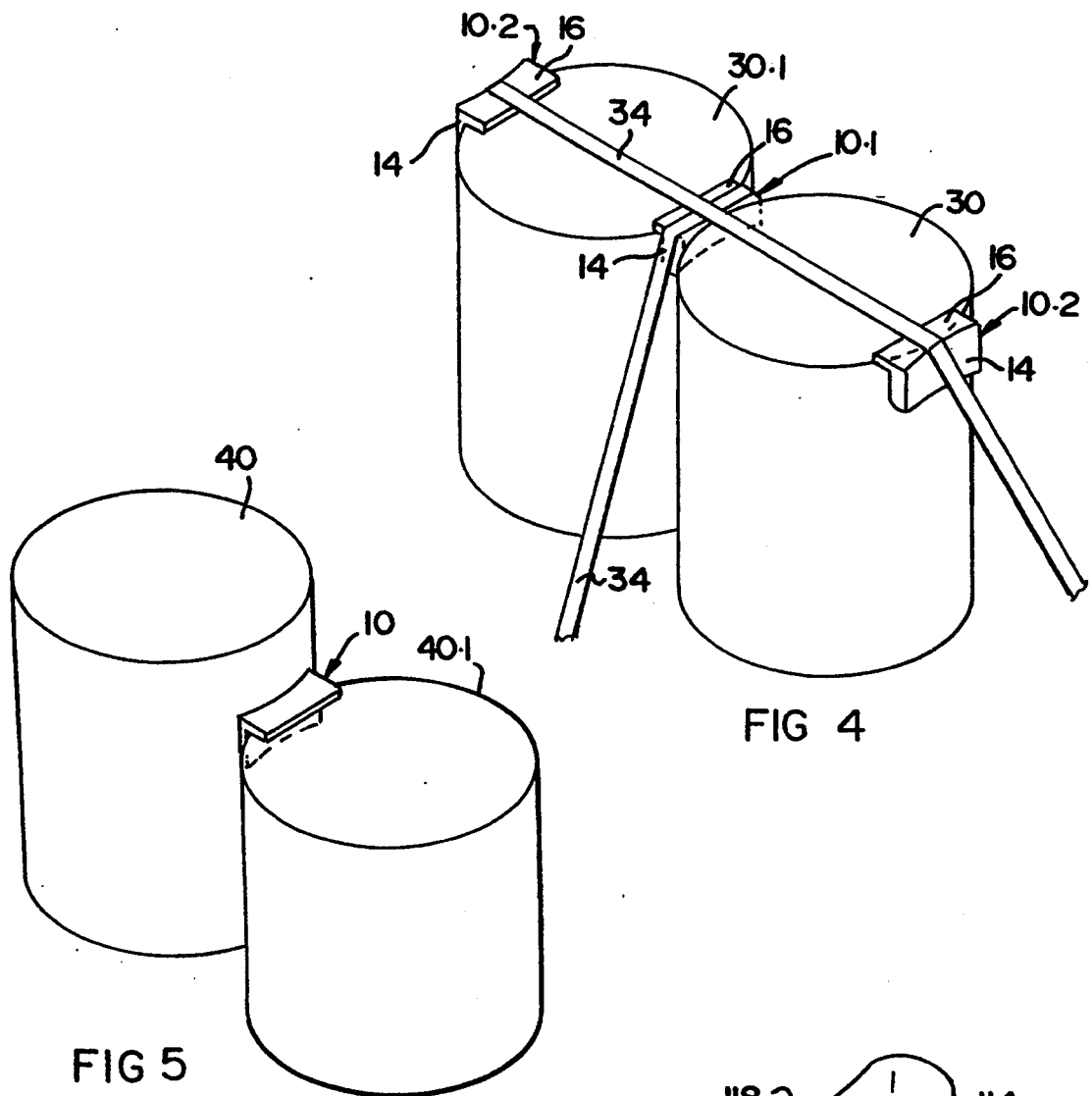
FIG 4
FIG 5
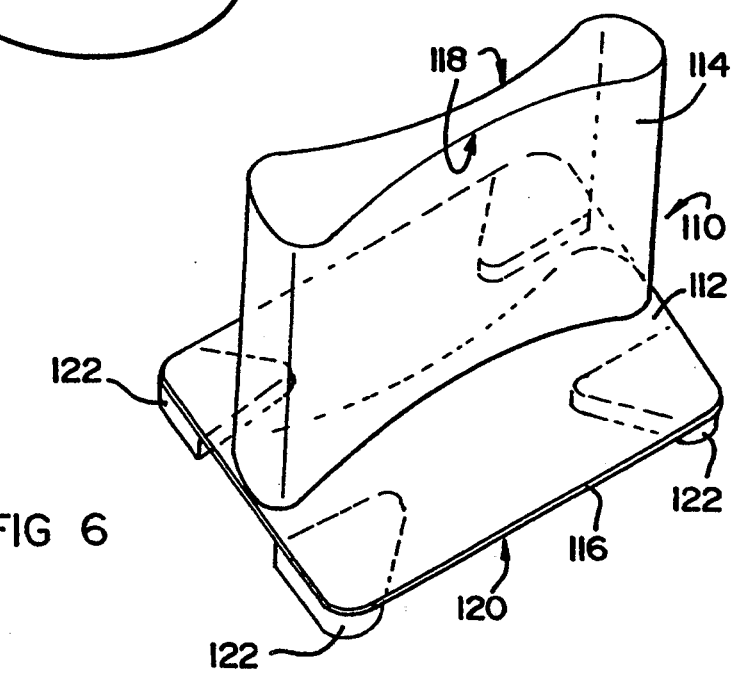
FIG 6

PROTECTOR DEVICE FOR PROTECTING PAPER ROLLS

THIS INVENTION relates to a protector device for protecting paper rolls during transport.

Paper rolls, particularly when transported from paper mills to users, are carried on the back of heavy load carrying vehicles. The rolls are positioned on a vehicle in an axially upright, adjacent configuration and are held in position by tying straps that engage the rolls and that are tied to the vehicle. Because of the substantial degree of vehicle instability that exists during vehicle motion, the outer paper layers of rolls that abut one another are exposed to severe damage, resulting in excessive losses. The above problem is well known and it is an object of this invention to at least alleviate this problem.

According to the invention there is provided a protector device for protecting paper rolls against damage during transport, which comprises a body having a spacer column defined to be locatable between adjacent paper rolls when positioned on a transport vehicle for holding the paper rolls in a spaced configuration with respect to one another and a support formation extending from one end of the support column in a configuration in which the formation can rest on the end of at least one of two adjacent paper rolls held in a spaced configuration with respect to one another by the support column in the operative configuration of the protector device.

The spacer column of the body may comprise an elongate columnar formation that can extend along a part of the axial length of a paper roll, in the operative configuration of the protector device. The length of the columnar formation may be between 100 mm and 450 mm and, typically, the length of the columnar formation is approximately 200 mm.

Furthermore, the spacer column may define oppositely directed abutment faces that are formed to abut against the outer side of adjacent paper rolls spaced apart thereby, in use of the protector device. Particularly, the said abutment faces are curved about axes parallel to the longitudinal axis of the column, the radius of the said curved faces being equal to the outer radius of paper rolls to be held in a spaced configuration thereby, permitting the said abutment faces to snugly abut the outer faces of rolls held in a spaced configuration by the protector device in its operative configuration.

Further according to the invention, the support formation may be a plate-like formation extending transversely from one end of the support column on one side thereof. Alternatively, the support formation may be a plate-like formation extending transversely from one end of the support column on both sides thereof. The size of the segment of the support formation that extends either from one or both sides of the support column is such that it can rest upon a sufficiently large segment of one of two adjacent paper rolls, for ensuring that the spacer column extending therefrom will remain securely located between the paper rolls spaced apart thereby.

According to a preferred embodiment of the invention, the support formation defines an outer face facing away from the support column, which outer face defines locating formations that project therefrom and that are disposed to locate at least one tying strap whereby paper rolls on a transport vehicle can be tied onto the vehicle. Preferably, the locating formations are disposed to provide for the location of a plurality of tying straps to be disposed in different orientations with respect to the support formation, for tying paper rolls onto a vehicle.

The exact features of the protector device of the invention are greatly variable and the invention extends also to all alternative configurations thereof and which incorporate the broad principles of the invention as are hereinabove defined.

The protector device of the invention may be of any suitable material such as of a glass fibre reinforced material, timber, a synthetic plastic material, or the like.

Preferably, the protector device of the invention is of a suitable synthetic plastic material and, as such, the complete device may be manufactured in one piece by any suitable synthetic plastic moulding process. It is envisaged also that the device may be manufactured in two pieces that are then secured together to form the protector device of the invention.

Further features of the invention, including the mode of use of the invention and the advantages of the invention, are described in more detail hereinafter with reference to two examples of the invention, illustrated by way of drawings. In the drawings:

FIG. 4 illustrates schematically in three dimensions the protector device of FIG. 1 in one operative configuration thereof;

FIG. 5 illustrates schematically in three dimensions the protector device of FIG. 1, in a second operative configuration thereof;

FIG. 6 shows a three-dimensional view of a second embodiment of a protector device for protecting paper rolls, in accordance with the invention;

Figure 1:
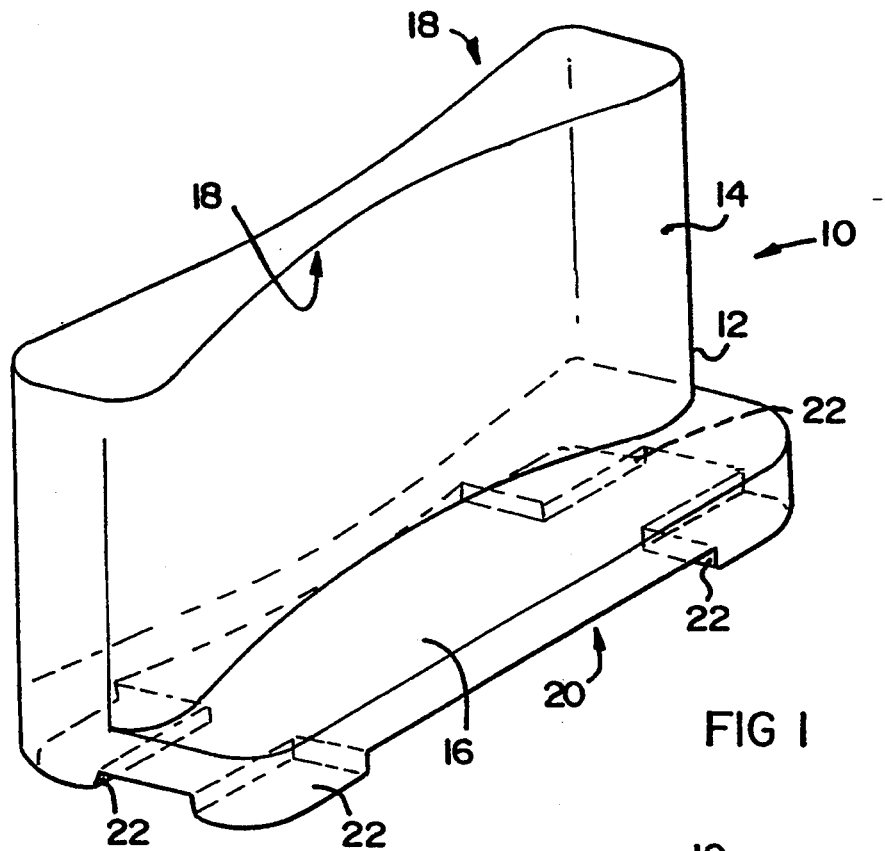
FIG. 1 shows a three-dimensional view of a first embodiment of a protector device for protecting paper rolls, in accordance with the invention.
Figure 2:
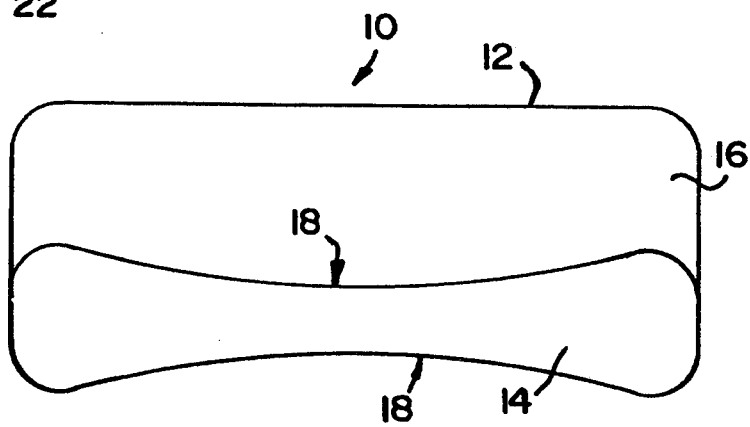
FIG. 2 shows an operative bottom plan view of the protector device of FIG. 1.

Referring initially to FIGS. 1 to 5 of the drawings, a first embodiment of a protector device for protecting paper rolls during transport, in accordance with the invention, is designated generally by the reference numeral 10.

The protector device 10 comprises an integrally formed synthetic plastic body 12, the body 12 including a spacer column 14 and a substantially planar, plate-like support formation 16 extending transversely from one end of the spacer column 14 on one side thereof.

The spacer column 14 defines two oppositely directed side faces 18 that are curved, the radius of curvature of the faces 18 being equal to the outer radius of a conventional paper roll as produced by a paper mill and which requires to be transported to a user by way of a suitable load carrying vehicle. Preferably, the column 14 is hollow and, as such, will provide a degree of flexibility.

Figure 3:
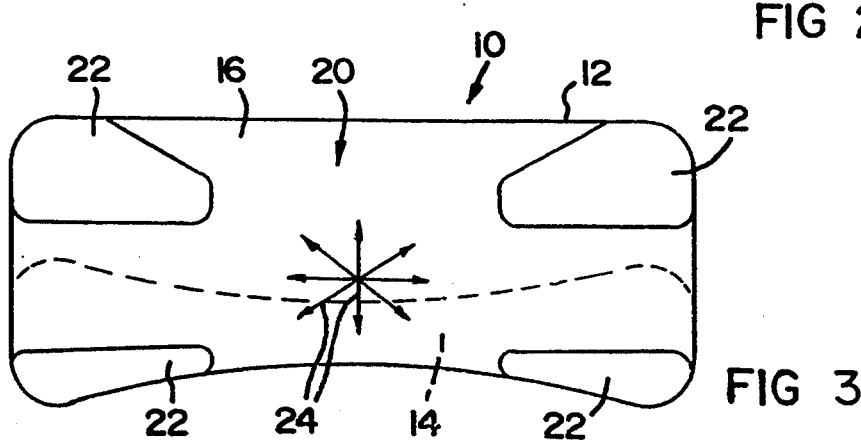
FIG. 3 shows an operative top plan view of the protector device of FIG. 1.
Figure 7:
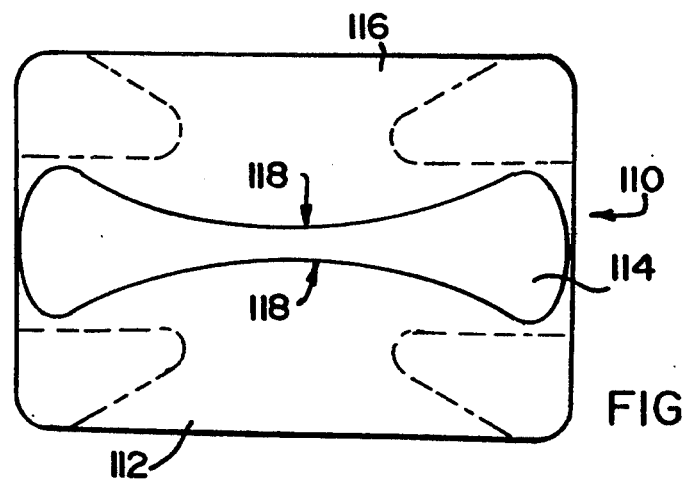
FIG. 7 shows an operative bottom plan view of the protector device of FIG. 6.
Figure 8:
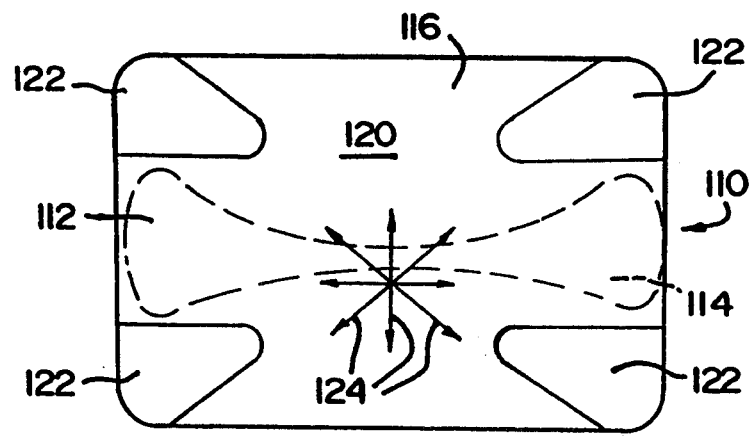
FIG. 8 shows an operative top plan view of the protector device of FIG. 6.

The face 20 of the support formation 16, that faces away from the spacer column 14, has four corner formations 22 projecting therefrom, the configuration of these formations 22 and their location being such that tying straps, that are commonly used for tying paper rolls onto the back of vehicles, can be located within any one of a plurality of locations defined by the corner formations 22, the different possible orientations of a tying strap with respect to the body 12, being illustrated by the lines 24 in FIG. 3 of the drawings. This aspect of the invention will be referred to in more detail hereafter.

Referring specifically to FIG. 4 of the drawings, when loading paper rolls 30 onto the load carrying deck (not shown) of a transport vehicle, the rolls are positioned in an axially upright configuration on the deck as shown. In this configuration, the rolls 30 are held in a spaced apart relationship by positioning a protector device 10.1 between the rolls 30. Particularly, in this operative configuration of the protector device 1 0, the spacer column 14 fits snugly between two adjacent rolls, opposing outer faces of the rolls 30 abutting against the opposite faces 18 of the column 14, the support formation 16 resting upon the operative top end of one of the rolls 30 to thereby secure the location of the body with respect to the rolls 30.

When so located, the rolls 30 can be tied to the vehicle by suitable tying straps 34, these straps 34 being located in position with respect to the body 12 by means of the formations 22 (not clearly illustrated in the drawing). Protector devices 10.2 also can be used on the sides of the rolls 30 over which the straps 34 pass (as shown), thereby protecting the rolls against damage that can be caused by the straps.

Clearly, when transporting a plurality of rolls 30, the protector devices 10 will be disposed between all adjacent rolls and by this effective spacing apart of the rolls 30, the damage that commonly occurs to the outer paper layers of a roll 30 is greatly eliminated, or at least reduced. This damage usually results from the instability that exists on the back of a load carrying vehicle while in motion and by the rubbing and bumping together of paper rolls, when not separated by a protector device as proposed.

Referring to FIG. 5 of the drawings, there is shown two paper rolls that are of unequal height and that require transportation. In this case, the support formation 16 of the protector device 10, for holding the rolls 40 in a separated configuration, rests only on the shorter roll 40.1, the use of the device 10 thus not being affected.

Referring now to FIGS. 6 to 9 of the drawings, a second embodiment of a protector device for protecting paper rolls during transport, in accordance with the invention, is designated generally by the reference numeral 110. The device 110 is essentially the equivalent of the device 1 0, insofar as it comprises an integrally formed synthetic plastic body 112, the body 112 including a spacer column 114 and a substantially planar, plate-like support formation 116 extending transversely from one end of the spacer column 114, the support formation 116 in this embodiment of the invention extending on both sides of the support column 114.

The spacer column 114 again defines two oppositely directed side faces 118 that are curved, the curvature of the faces 118 being the same as the curvature of the faces 18 of the spacer column 14 of the protector device 10.

Still further, the face 120 of the support formation 116 that faces away from the spacer column 114, again has four corner formations 122 projecting therefrom, the configuration of these formations 122 being the equivalent of the formations 22 of the protector device 10.

Figure 9:
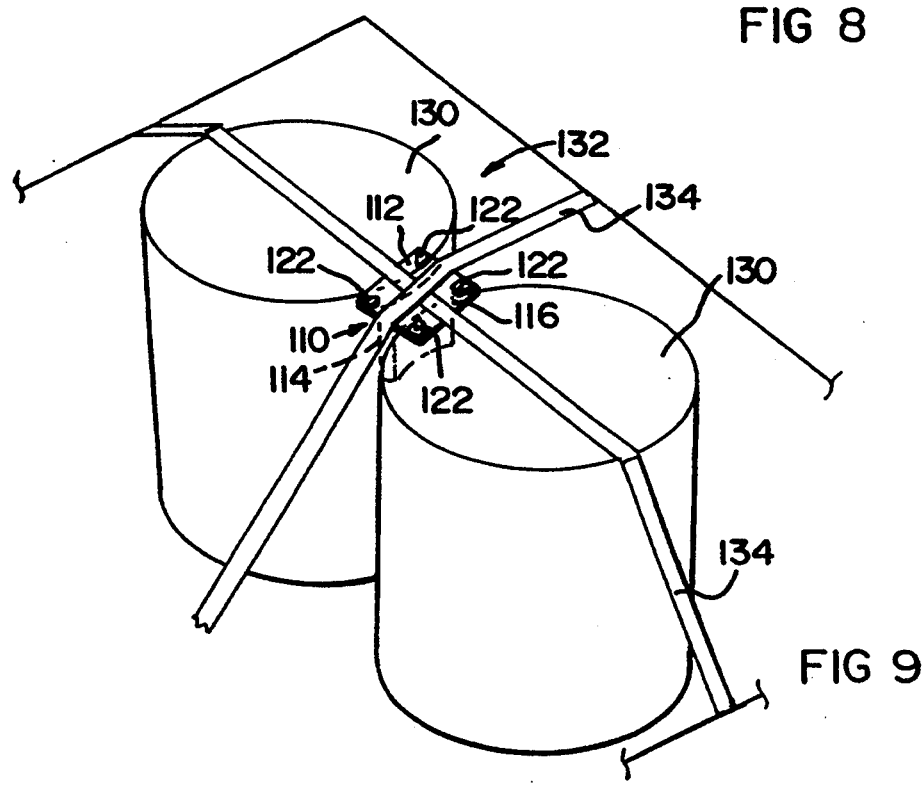
FIG. 9 illustrates schematically in three dimensions the protector device of FIG. 6, in its operative configuration.

The mode of use of the protector device 110 is thus equivalent to the mode of use of the protector device 10, except insofar as the device 110 will only be used in association with paper rolls 130 that are of an equal height and where each paper roll 130 has a segment of the support formation 116 resting thereon, as is illustrated clearly in FIG. 9 of the drawings where two adjacent paper rolls 1 30 are illustrated in their loaded configuration on the deck 132 of a transport vehicle. Once again, the formations 122 projecting from the support formation 116 provide for the effective location of tying straps 134, the configuration of tying straps 134 with respect to the protector device 110 being illustrated clearly in FIG. 9 of the drawings.

The protector devices 10, 110 thus serve the purpose of protecting the outer paper layers of paper rolls being transported, while at the same time enhancing the secure location of paper rolls with respect to one another and facilitating the location of tying straps whereby the paper rolls are tied to a vehicle.

It will be understood that the exact configuration of the protector device of the invention is greatly variable and it is anticipated that the device can be manufactured of alternative materials such as of a glass fibre reinforced material, timber, or the like. Also, the device of the invention can be made in two or more pieces that are suitably secured together to form the configuration as described.

I claim:

1. A protector device for protecting paper rolls against damage during transport, which comprises a body having a spacer column formed to be locatable between two adjacent paper rolls when positioned on a transport vehicle for holding the paper rolls in a spaced configuration with respect to one another and a support formation extending from one end of the spacer column in a configuration in which the formation can rest on the end of at least one of two adjacent paper rolls held in a spaced configuration with respect to one another by the spacer column, in the operative configuration of the protector device, and wherein the support formation defines an outer face facing away from the support column, which outer face defines locating formations that project therefrom and that are at least one tying strap whereby paper rolls on a transport vehicle can be tied onto the vehicle.

2. A protector device as claimed in claim 1, in which the spacer column of the body comprises an elongate columnar formation that can extend along a part of the axial length of a paper roll, in the operative configuration of the protector device.

3. A protector device as claimed in claim 2, in which the length of the columnar formation is between 100 mm and 450 mm.

4. A protector device as claimed in claim 2, in which the length of the columnar formation is approximately 200 mm.

5. A protector device as claimed in claim 1, in which the spacer column defines oppositely directed abutment faces that are formed to abut against the outer side of adjacent paper rolls spaced apart thereby, in use, of the protector device.

6. A protector device as claimed in claim 5, in which the said abutment faces are curved about axes parallel to the longitudinal axis of the column, the radii of the said abutment faces that are curved being equal to the outer radii of paper rolls to be held in a spaced configuration thereby, permitting the said abutment faces to snugly abut the outer faces of rolls held in a spaced configuration by the protector device in its operative configuration.

7. A protector device as claimed in claim 1, in which the support formation extends transversely from one end of the support column on one side thereof.

8. A protector device as claimed in claim 1, in which the support formation extends transversely from one end of the support column on both sides thereof.

9. A protector device as claimed in claim 1, in which the locating formations are disposed to provide for the location of a plurality of tying straps to be disposed in different orientations with respect to the support formation, for tying paper rolls onto a vehicle.

10. A protector device as claimed in claim 1, in which the body is formed integrally of a synthetic plastic material.

* * * * *

UNITED STATES PATENT AND TRADEMARK OFFICE
CERTIFICATE OF CORRECTION

PATENT NO. : 5,381,898
DATED : January 17, 1995
INVENTOR(S) : Richard A. Jones

It is certified that error appears in the above-identified patent and that said Letters Patent is hereby corrected as shown below:

Claim 1, line 15, (Column 4, line 50), after "are" insert --disposed to locate--.

Signed and Sealed this

Twenty-first Day of March, 1995

Attest:

BRUCE LEHMAN

Attesting Officer     Commissioner of Patents and Trademarks